United States Patent [19]
DeLorean

[11] Patent Number: 5,359,941
[45] Date of Patent: Nov. 1, 1994

[54] TRANSPORTATION SYSTEM, VEHICLE AND METHOD

[75] Inventor: John Z. DeLorean, Bedminster, N.J.

[73] Assignee: Genesis III, LLC, Bedminster, N.J.

[21] Appl. No.: 47,635

[22] Filed: Apr. 14, 1993

[51] Int. Cl.$^5$ .............................................. B61C 11/00
[52] U.S. Cl. ..................................... 105/73; 105/453; 104/23.2; 104/124
[58] Field of Search ............................ 105/73, 74, 75; 104/23.1, 23.2, 123, 124, 287, 288

[56] References Cited

U.S. PATENT DOCUMENTS

| | | |
|---|---|---|
| 2,225,186 | 12/1940 | Sorenson . |
| 3,353,498 | 11/1967 | Davis . |
| 3,443,524 | 5/1969 | Schneider ........................... 104/23.2 |
| 3,580,181 | 5/1971 | Bertin et al. . |
| 3,601,062 | 8/1971 | Bertin et al. . |
| 3,621,787 | 11/1971 | Giraud . |
| 3,631,806 | 1/1972 | Barthalon ............................ 104/23.2 |
| 3,648,620 | 3/1972 | Bertin et al. . |
| 3,727,715 | 4/1973 | Barthalon ............................ 104/23.2 |
| 3,737,590 | 6/1973 | Johnston ............................. 104/23.2 |
| 3,774,542 | 11/1973 | Walsh . |
| 3,799,061 | 3/1974 | Bertin et al. . |
| 3,889,602 | 6/1975 | Barber ................................. 104/23.2 |
| 3,910,196 | 10/1975 | Derenburg . |
| 4,061,089 | 12/1977 | Sawyer . |
| 4,841,871 | 6/1989 | Leibowitz ........................... 104/23.1 |

*Primary Examiner*—Mark T. Le
*Attorney, Agent, or Firm*—R. Neil Sudol; Henry D. Coleman

[57] ABSTRACT

A transport assembly for use, for example, in mass transportation, comprises a track and a frame mounted to the track for motion therealong, the frame including a housing which defines a traction chamber in communication with the track. At least one traction wheel is rotatably mounted to the frame in friction contact with the track. The traction wheel is at least partially disposed in the traction chamber. A car with a passenger compartment is coupled to the frame via a shock absorbing linkage so that the car is substantially isolated from irregularities in the track during motion of the frame and the car along the track. A suction source is operatively connected to the housing for generating a vacuum in the traction chamber during motion of the frame and the car along the track. A drive mounted to the frame is operatively connected to the traction wheel for drivingly rotating the wheel to propel the frame and the car along the track.

17 Claims, 5 Drawing Sheets

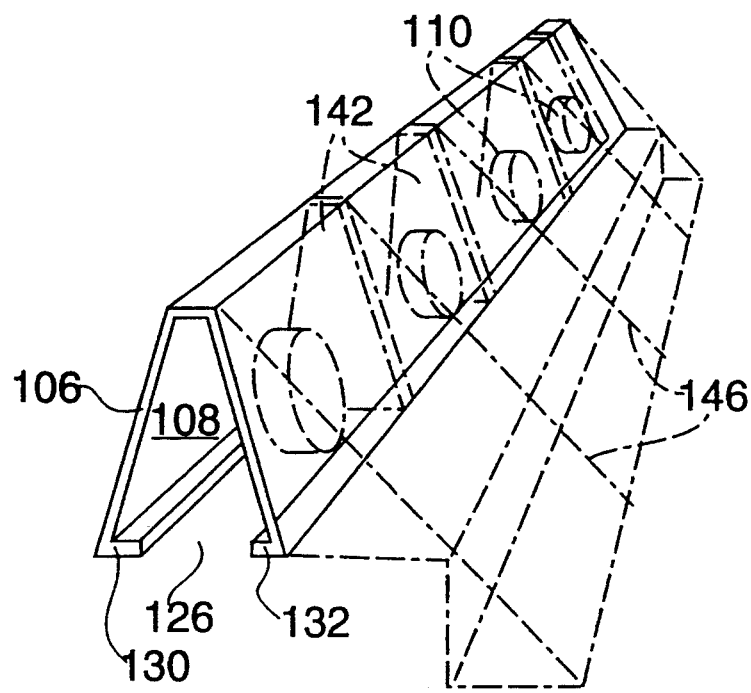
FIG. 11
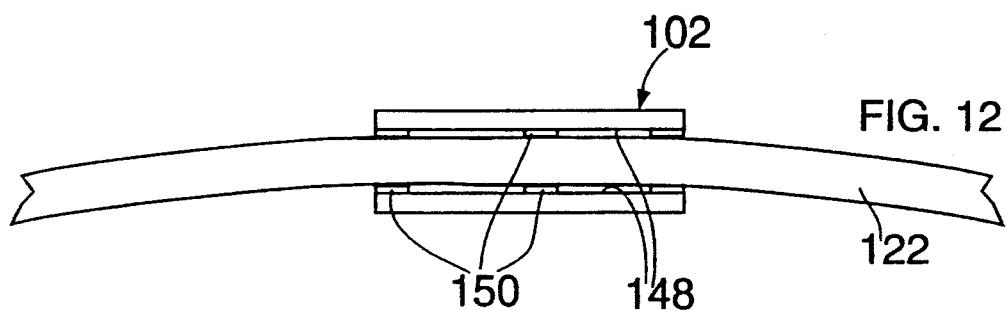
FIG. 12
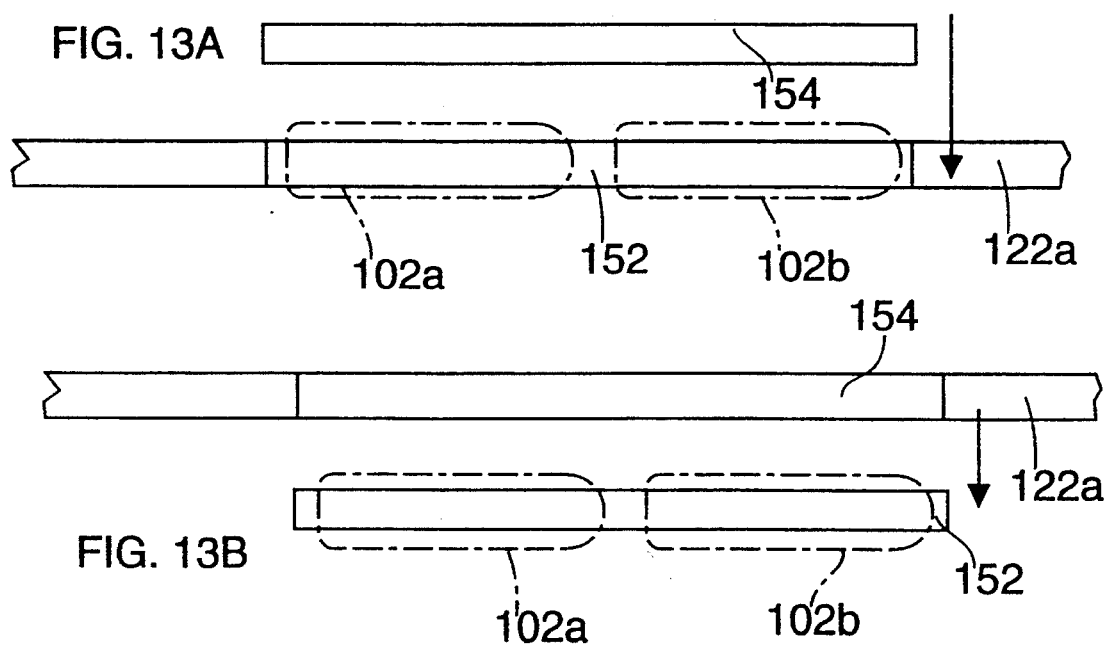
FIG. 13A
FIG. 13B

TRANSPORTATION SYSTEM, VEHICLE AND METHOD

BACKGROUND OF THE INVENTION

This invention relates in general to a transportation system and in particular to a mass transportation system. More particularly, this invention relates to a mass transportation system in conjunction with a highway. This invention also relates to a transportation vehicle. In addition, this invention relates to a method for transporting goods or people.

As the population increases, there arises an ever greater demand for faster and more efficient mass transportation between the urban centers. Much creative effort has been expended to develop such improved mass transit systems. For example, U.S. Pat. Nos. 3,353,498 to Davis, 3,580,181 to Bertin et al., 3,774,542 to Walsh, and 3,799,061 to Bertin, 3,910,196 to Denenburg all disclose elevated mass transportation systems in which a passenger vehicle is suspended from an overhead rail or track. Walsh, in particular, discloses a mass transit line which is disposed above the median strip of a multiple lane highway. Other mass transportation systems involve so-called ground effect vehicles which ride on a cushion or layer of air. See, for example, U.S. Pat. Nos. 3,621,787 to Giraud, 3,601,062 to Bertin, and 3,648,620 to Bertin et al. These two features of an elevated railway and an air cushion support are combined in the teachings of U.S. Pat. No. 4,061,089 to Sawyer.

The major problem in attempting to build new mass transit lines between the ever growing cities is that the land between the cities is already occupied by suburban sprawl. The major costs in developing new mass transit lines are not construction costs, which presently average between $1 million and $6 million per mile, but rather the costs of the rights of way, which in a city may cost as much as $30 million to $80 million.

OBJECTS OF THE INVENTION

An object of the present invention is to provide an improved inter-city transportation system.

Another object of the present invention is to provide a mass transportation system to be erected between existing metropolitan centers.

A further object of the present invention is to provide such a mass transportation system which has a reduced total cost per mile in comparison with conventional mass transportation systems.

Another, more particular, object of the present invention is to provide such a mass transportation system which utilizes pre-existing rights of way.

Yet another object of the present invention is to provide a mass transportation vehicle which can be used in such a transportation system or even separately in existing transportation systems.

A related object of the present invention is to provide such a vehicle which will cling to the track at high speeds.

An associated object of the present invention is to provide a method for the land transportation of goods and/or passengers at high speeds.

An additional object to the present invention is to provide such a vehicle which is isolated from irregularities in the track.

SUMMARY OF THE INVENTION

A transport assembly for use, for example, in mass transportation, comprises a track and a frame mounted to the track for motion therealong, the frame including a housing which defines a traction chamber in communication with the track. At least one traction wheel is rotatably mounted to the frame in friction contact with the track. The traction wheel is at least partially disposed in the traction chamber. A car with a passenger compartment is coupled to the frame via a shock absorbing linkage so that the car is substantially isolated from irregularities in the track during motion of the frame and the car along the track. A suction source is operatively connected to the housing for generating a vacuum in the traction chamber during motion of the frame and the car along the track. A drive mounted to the frame is operatively connected to the traction wheel for drivingly rotating the wheel to propel the frame and the car along the track.

Pursuant to another feature of the present invention, the transport assembly further comprises a pressurization mechanism mounted to the frame for generating an air cushion between the car and the track during motion of the frame and the car along the track at velocities under a predetermined speed. The car means is preferably provided at a forward end with an air intake guide for channeling air between the car and the track during motion of the frame and the car along the track, thereby generating, via a ramjet process, a supporting cushion of air between the car and the track at velocities above the predetermined speed.

As discussed in greater detail hereinafter, the track may extend along a median strip between lanes of a divided highway. The track may be elevated over the median strip. Where the median strip is narrow, the track may be disposed in cantilever fashion over one or more lanes of traffic from the median strip.

Pursuant to another feature of the present invention, the frame includes a center beam disposed over the track and extending parallel thereto. The car is provided with passenger seats facing outwardly from the beam on opposite sides thereof and includes gull wing doors opening outwardly on opposing sides of the beam.

The shock absorbing linkage between the passenger car and the frame or support beam may include straps and/or shear mounts.

Where the track extends through freezing climates, it may be provided with a heating device for de-icing the track during cold weather.

A transportation method in accordance with the present invention comprises the steps of (a) placing a cargo in a cargo compartment of a vehicle, (b) closing the compartment, (c) generating a vacuum in a traction chamber containing at least a portion of a traction wheel of the vehicle, thereby pressing the wheel against a track in communication with the chamber, (d) rotating the wheel to drive the vehicle along the track, and (e) mechanically buffering the compartment from irregularities in the track during motion of the vehicle along the track.

As discussed above, the buffering may be implemented by generating a layer of air between the compartment and the track. The layer of air may be generated by fans at speeds below a predetermined speed, while at speeds above that predetermined speed, the layer may be generated solely by a ramjet process.

A transportation system in accordance with another feature of the present invention comprises a divided highway including a first set of multiple lanes for one direction of ground transportation and a second set of multiple lanes for another direction of ground transportation opposite to the one direction. The highway further includes a median strip separating the first set of multiple lanes from the second set of multiple lanes. The first set of multiple lanes includes a first inner lane essentially juxtaposed to the median strip, while the second set of multiple lanes includes a second inner lane essentially juxtaposed to the median strip on a side thereof opposite the first inner lane. The mass transportation system further includes a first track, a second track, and an assembly for supporting in cantilever fashion from the median strip, the first track over the first inner lane and the second track over the second inner lane, respectively. A plurality of mass transit passenger cars are movably supported on the two tracks.

In a particular embodiment of the present invention, each of the mass transit passenger cars includes a pressurization source for generating an air cushion between the respective passenger car and the respective track on which the passenger car rides. In addition, each of the passenger cars includes a body defining a passenger compartment, systems for heating, ventilating and air conditioning the compartment, and a propulsion mechanism for moving the respective passenger car along one of the elevated tracks. The propulsion mechanism preferably includes a traction wheel in a vacuum compartment which is subjected to negative pressure to press the wheel onto the track during motion of the vehicle along the track.

A mass transportation system in accordance with the present invention can be erected between existing metropolitan centers. Such a mass transportation system has a substantially reduced total cost per mile in comparison with conventional mass transportation systems. The reduction in cost is largely due to the use of pre-existing rights of way.

A transportation system comprises, in accordance with another feature of the present invention, a highway having a plurality of laterally contiguous lanes for at least one direction of ground transportion and a track supported, in cantilever fashion from a side of the highway, so that the track extends over a number of the lanes fewer than all of the lanes. A mass transit passenger car is movably supported on the track.

Each of the passenger cars preferably includes a body defining a passenger compartment, means for heating, ventilating and air conditioning the compartment, and a propulsion mechanism for moving the respective passenger car along one of the tracks. The propulsion mechanism is attached to the body via a shock-absorbing linkage, while each of the passenger cars further includes a suction or vacuum generator for maintaining the respective propulsion mechanism in contact with the respective track. Also, the passenger car includes a pressurization device for generating an air cushion between the respective passenger car and the track.

BRIEF DESCRIPTION OF THE DRAWINGS

FIG. 11 is a schematic perspective view of a traction chamber housing and drive wheels of the mass transit vehicle of FIG. 8.

FIG. 12 is a diagram of a vehicle in accordance with the present invention, showing air cushions or wheels for facilitating the negotiation of turns by the vehicle.

FIG. 13A and FIG. 13B are diagrams showing a removal of vehicles from a track, to enable passenger disembarkation or loading or car maintenance.

DETAILED DESCRIPTION

Figure 1:
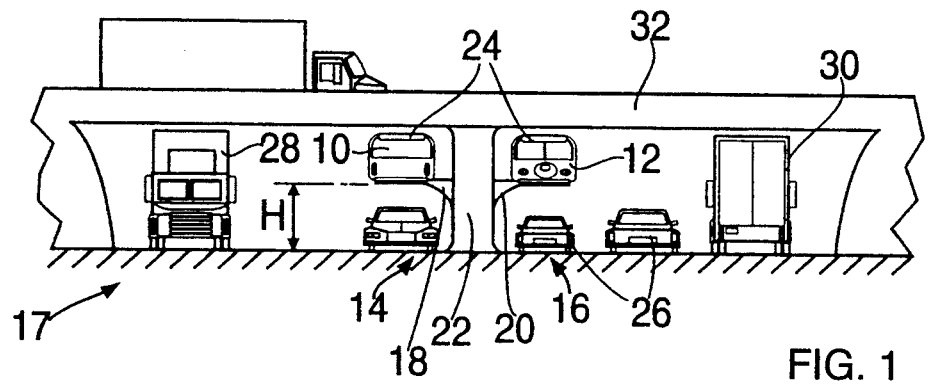
FIG. 1 is a schematic transverse cross-sectional view of a transportation system in accordance with the present invention.
Figure 2:
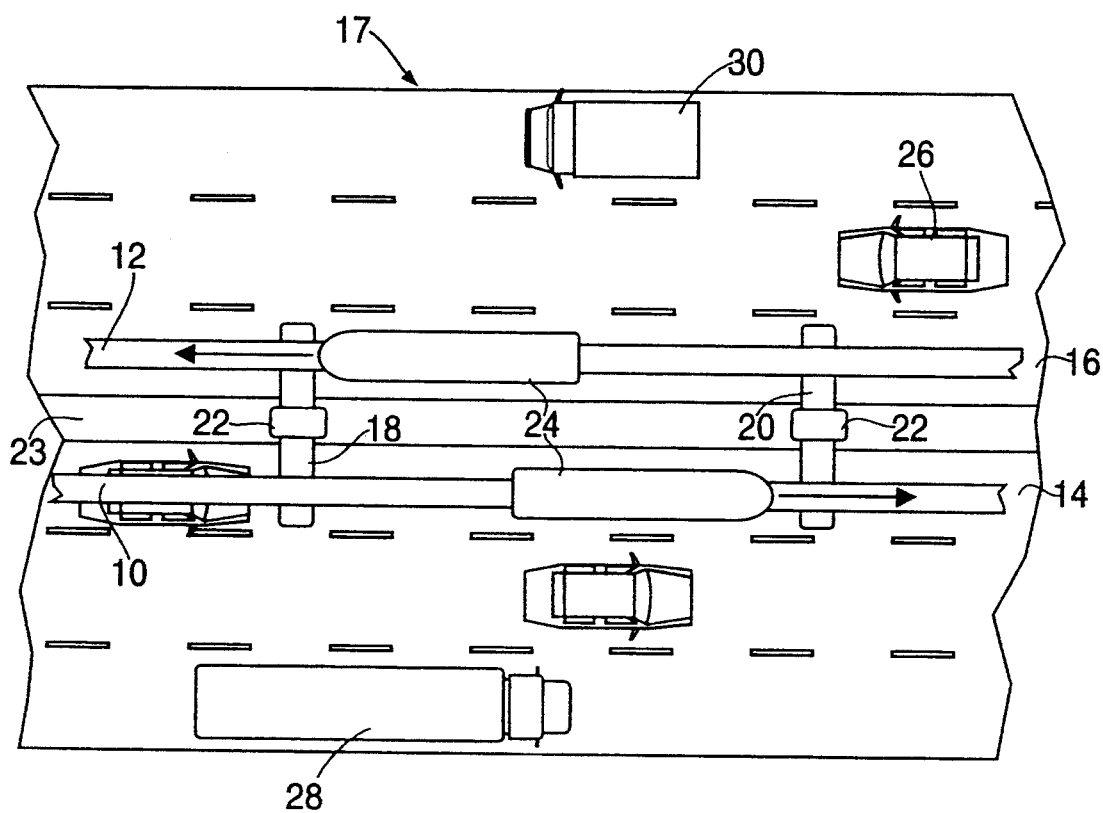
FIG. 2 is a schematic partial top view of the transportation system of FIG. 1.

As illustrated in FIGS. 1 and 2, monorail type rails or tracks 10 and 12 for a high-speed inter-city mass transit system are supported over central, or inner, passing lanes 14 and 16 of a multiple-lane, limited access, divided highway 17. The rails are supported by spaced cantilever arms 18 and 20 extending from columns or posts 22 fixed in the ground at a median strip 23 of highway 17. Rails 10 and 12 are advantageously provided with electrical power and control wiring (not illustrated).

Individual self-propelled mass transit passenger cars 24 travel over rails 10 and 12. Rails 10 and 12 are disposed at a vertical height H sufficiently high to enable passenger type automobiles 26, including vans, to travel in the central, passing lanes 14 and 16 of highway 17. Commercial trucks 28 and 30 which have a height greater than a minimum commercial truck height, however, would be prohibited from traveling in those center lanes. Such trucks could not use the central, passing or emergency lanes of the highway without colliding with the cantilever arms 18 and 20. Moreover, the vertical position or elevation of rails 10 and 12 is sufficiently low, and the height of mass transit cars 24 is sufficiently small to enable the cars to pass beneath a bridge or overpass 32.

Figure 3:
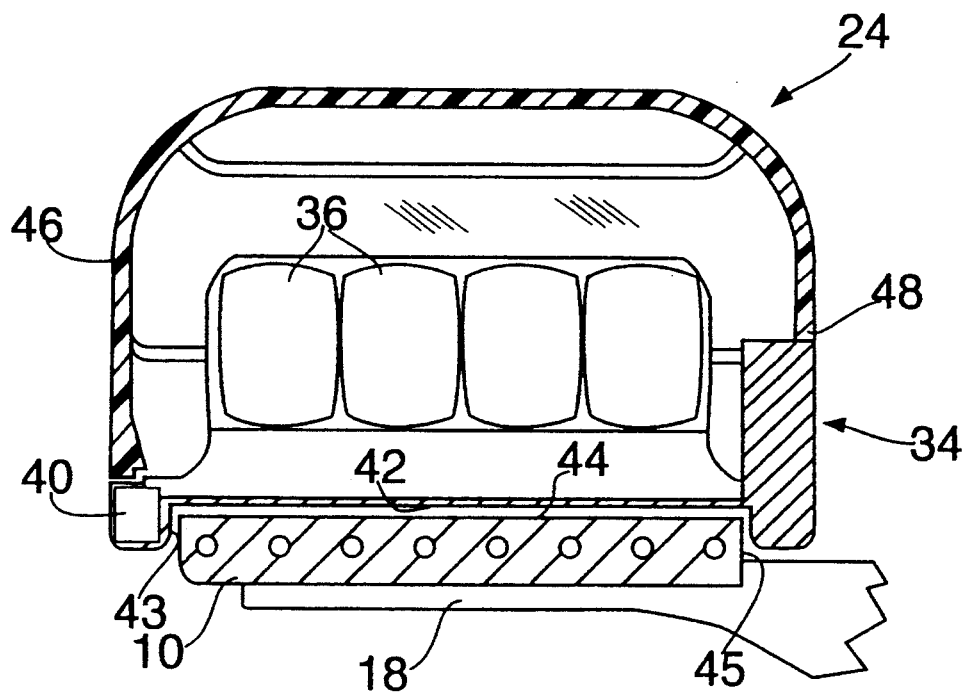
FIG. 3 is a partially schematic transverse cross-sectional view of a mass transit passenger car shown in FIGS. 1 and 2.
Figure 4:
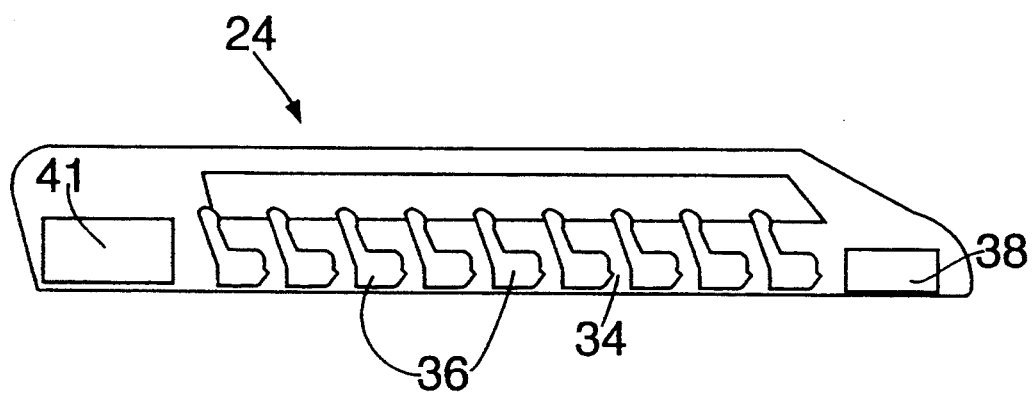
FIG. 4 is a schematic longitudinal cross-sectional view of the mass transit passenger car of FIG. 3.

FIGS. 3 and 4 illustrate a mass transit car 24 which is a very high speed, ultra light weight vehicle which includes a body 34 provided with integrally molded seats 36 and equipped with a propulsion unit 38 and HVAC components 40. To minimize security problems, it is advisable to permit only a seated position to passengers in car 24. Car 24 includes an upper part 46 hingedly connected at 48 in the manner of a gull wing to car body 34, the passengers being permitted to stand only upon opening of the upper part in a train station at a city center.

In addition, car body 34 carries a pressure source 41 for generating a cushion of air between a horizontally oriented bottom surface 42 of car body 34 and a horizontally oriented upper surface 44 of rails 10 and 12 and also between vertically oriented surfaces 43 of car body 34 and vertically oriented surfaces 45 of rails 10 and 12. The cushion of air preferably has a maximum thickness of one-tenth of an inch.

Propulsion unit 38 may take the form of a conventional drive contacting rails 10 and 12 through friction or intermeshing teeth but preferably is of the type discussed hereinafter with reference to FIGS. 5 and 6.

The use of an air cushion should enable the mass transit passenger cars to travel from city center to city center at average speeds between 200 and 300 miles per hour. The electric controls for the mass transit system can be similar to those already in use in San Francisco's BART system.

Figure 6:
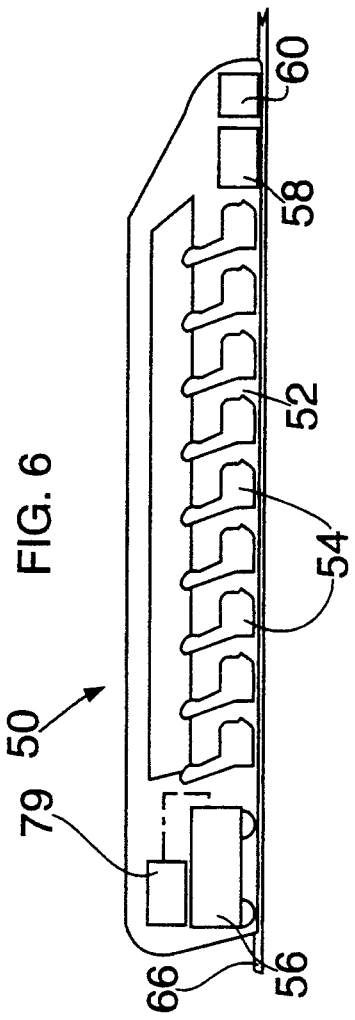
FIG. 6 is a schematic longitudinal cross-sectional view of the mass transit passenger car of FIG. 5.
Figure 5:
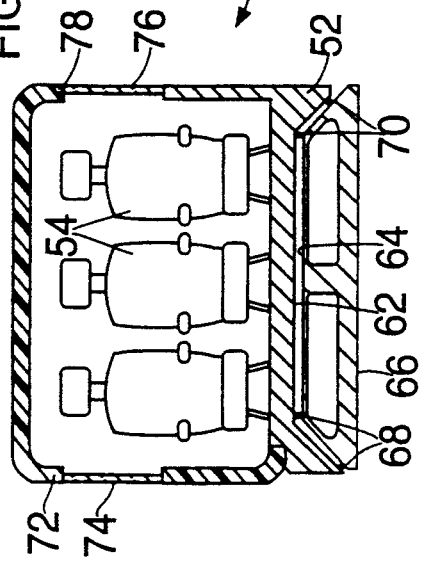
FIG. 5 is a partially schematic transverse cross-sectional view of another embodiment of a mass transit passenger car in accordance with the present invention.

As illustrated in FIGS. 5 and 6, another mass transit passenger car 50 comprises a body 52 provided with seats 54 and equipped with a propulsion unit 56 and HVAC components 58. In addition, car body 52 carries a pressure source 60 for generating a cushion of air between bottom surfaces 62 of car body 52 and upper surfaces 64 of a rails 66. Bottom surfaces 62 are provided about their peripheries with air sealing strips 68 and 70 engageable with upper surfaces 64 of rails 66. Car 50 also includes an upper part 72 with windows 74 and 76 and hingedly connected at 78 in the manner of a gull wing to car body 52.

Propulsion unit 56 is a regenerative traction unit with reverse ground effect for traction without weight. The propulsion unit accelerates and decelerates car 50 and provides energy to a lighting system (not illustrated) and HVAC components 58. Propulsion or traction unit 56 may be suspended from car body 52 and maintained in contact with rail 66 via an application of suction or a vacuum by a unit 79.

Figure 7:
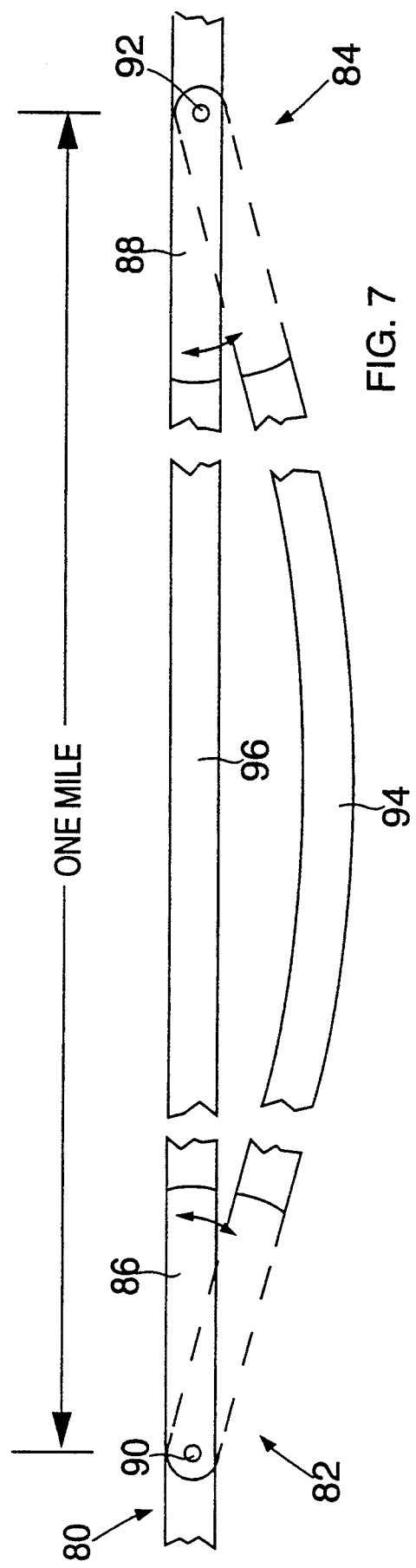
FIG. 7 is a schematic top or plan view of a pair of track switching stations of a mass transit system in accordance with the present invention, showing a local line extending substantially parallel to an express line.

As illustrated in FIG. 7, a rail 80 for carrying and guiding a high-speed mass transit vehicle includes a pair of track switching stations 82 and 84 having respective rail sections 86 and 88 swingably mounted at pivot points 90 and 92 for switching a passenger car's path alternately from a local line or track portion 94 to an express line or track portion 96 extending substantially parallel to the local line. Local track 94 might exemplarily have a length of one mile. Such local tracks would ideally be kept to a minimum to reduce upkeep costs and facilitate especially high speed travel between urban centers.

In order to obviate any adverse effects that the switching of the main track or rail 80 might have, the duration of the switching operation is minimized. Alternatively, switching facilities like those in a conventional railway system might be used. In such a case, propulsion unit 56 (FIG. 6) would be located at the forward end of car 50, while a sensor might be provided on the track to detect the passage of the car.

Figure 8:
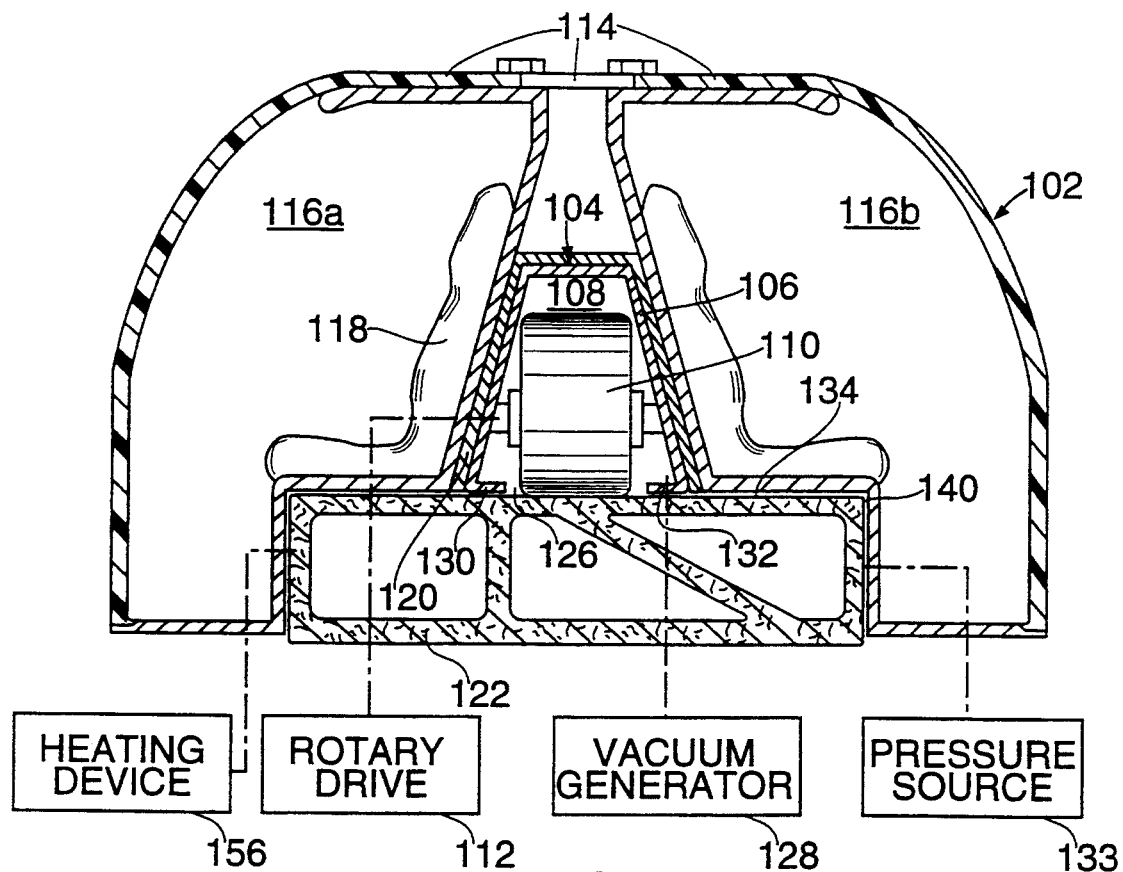
FIG. 8 is partially a schematic transverse cross-sectional view of yet another embodiment of a mass transit vehicle in accordance with the present invention and partially a block diagram of functional components of the vehicle.

As illustrated in FIG. 8, another transportation vehicle 102 comprises a frame 104 with an elongate channel member 106 which defines a traction chamber 108 and which houses one or more traction wheels 110 (see also FIG. 11). Wheels 110 are rotatably mounted to frame 104 and are operatively connected to a rotary drive 112 which is mounted to frame 104. Frame 104 carries a car body 114 which defines a plurality of passenger compartments 116a, 116b. Disposed in passenger compartments 116a, 116b and attached to car body 114 are a plurality of outwardly facing seats 118.

Figure 10:
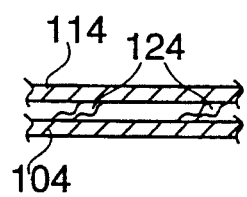
FIG. 10 is a schematic diagram of a shock absorbing connection between a car compartment and a frame of a mass transit vehicle such as that of FIG. 8.

Car body 114 is coupled to frame 104 via shock absorbing componentry 120 such as shear mounts. Accordingly, car body 114 is substantially isolated from irregularities in a track or road surface 122 during motion of vehicle 102 along the track. As schematically depicted in FIG. 10, the shock absorbing function may be at least partially performed by a plurality of straps 124 connecting car body 114 to frame 104.

As further illustrated in FIG. 8, traction chamber 108 has an opening 126 traversed by one or more of the wheels 110 so that the wheels make contact with track 122. A suction source or vacuum generator 128 mounted to frame 104 is operatively connected to the traction housing or channel member 106 for generating a vacuum in traction chamber 108 to press the housing and the wheel(s) to track 122, thereby increasing the frictional contact between the wheel(s) 110 and track 122. Channel or traction housing member 106 is advantageously provided along lower flanges 130 and 132 with sealing strips (not illustrated) for enhancing the vacuum generated in traction chamber 108.

As additionally illustrated in FIG. 8, a pressurization source 133 is mounted to frame 104 for generating an air cushion between car body 114 and track 122 during motion of frame 104 and the car body along the track at velocities under a predetermined speed. Except for a limited area (e.g., 15 inches) at the center of its upper surface 134, track 122 is provided with a coating (not shown) of low-friction material such as polytetrafluoroethylene.

Figure 9:
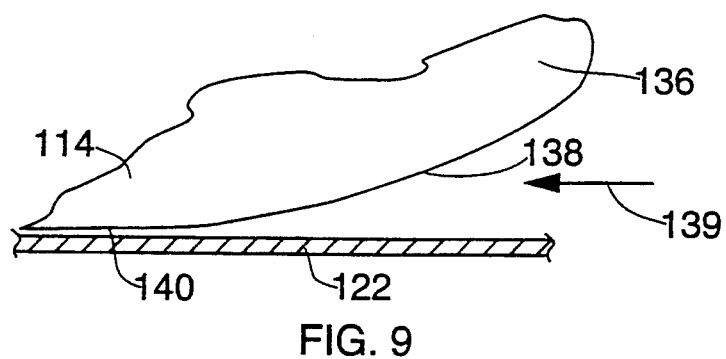
FIG. 9 is partially a schematic side elevational view of a forward end portion of the mass transit vehicle of FIG. 8, showing a ramjet guide surface.

As diagrammatically depicted in FIG. 9, frame 104 and/or car body 114 is provided at a forward end 136 with a guide surface 138 designed to force air (arrow 139) into a space 140 between the frame or car body, on the one hand, and track 122, on the other hand, during motion of the vehicle 102 along track 122 at velocities above the predetermined speed. Thus, via a ramjet process, a supporting cushion of air is generated between vehicle 102 and track 122 at velocities above the predetermined speed.

FIG. 11 shows a plurality of traction wheels 110 disposed inside traction housing or channel member 106. Each traction wheel 110 is rotatably mounted to frame 104 and is operatively connected to drive 112 (FIG. 8) or to separate drives. A plurality of baffle plates 142 may be provided in channel member 106 for separating chamber 108 into a plurality of subchambers (not designated) each housing a respective wheel 110. A plurality of tension members 146 may be provided for suspending or supporting car body 114 from frame 104.

As schematically indicated in FIG. 12, vehicle 102 may be provided along internal lateral surfaces 148 with a plurality of air jets or pads 150 for centering the vehicle to negotiate the gradual curves in track 122. The air pads 150 may be spaced at the front and rear ends of vehicle 102 and at midpoints on surfaces 148 to ensure contact at three points during a turn. Alternatively or additionally, supplementary wheels (not shown) may be provided for emergency use.

FIG. 13A and FIG. 13B illustrate a method for removing vehicles 102a and 102b from a track 122a, to enable passenger disembarkation or loading or car maintenance. To accomplish the removal, a first track section 152 bearing one or more vehicles 102a and 102b is shifted from alignment with track 122a. Simultaneously or subsequently, an empty traction 154 is shifted into alignment with track 122a. Prior to use, empty track section 154 may be located above or below or to the side of track section 152. Switching a car from one track to another may be accomplished partially in the same way. Upon removal of a track section with a car from one track, the track section and car may be moved to a different level and redirected via a turntable.

As shown in FIG. 8, where track 122 extends through freezing climates, the track may be provided with a heating device 156 for de-icing the track during cold weather.

The cars may be ganged to minimize stops.

It is to be noted that components of a mass-transit vehicle as described herein are well known. For example, traction motors have been in existence for a century.

Although the invention has been described in terms of particular embodiments and applications, one of ordinary skill in the art, in light of this teaching, can generate additional embodiments and modifications without departing from the spirit of or exceeding the scope of the claimed invention. For example, the tracks or rails of a mass transit system in accordance with the present invention could be suspended from the cantilevered arms of the support posts. In that case, the mass transit passenger cars would preferably be suspended from the rails. Accordingly, it is to be understood that the drawings and descriptions herein are proferred by way of example to facilitate comprehension of the invention and should not be construed to limit the scope thereof.

What is claimed is:

1. A transport assembly comprising:
   a track;
   a frame mounted to said track for motion therealong, said frame including housing means for defining a traction chamber in communication with said track;
   at least one traction wheel rotatably mounted to said frame and in friction contact with said track, said traction wheel being at least partially disposed in said traction chamber:
   car means for defining a passenger compartment;
   shock absorbing means for connecting said car means to said frame so that said car means is substantially isolated from irregularities in said track during motion of said frame and said car means along said track;
   suction means operatively connected to said housing means for generating a vacuum in said traction chamber during motion of said frame and said car means along said track; and
   drive means mounted to said frame and operatively connected to said traction wheel for drivingly rotating said traction wheel to propel said frame and said car means along said track.

2. The assembly defined in claim 1, further comprising pressurization means mounted to said frame for generating an air cushion between said car means and said track during motion of said frame and said car means along said track at velocities under a predetermined speed.

3. The assembly defined in claim 2 wherein said car means is provided at a forward end with guide means for channeling air between said car means and said track during motion of said frame and said car means along said track to generate, via a ramjet process, a supporting cushion of air between said car means and said track at velocities above said predetermined speed.

4. The assembly defined in claim 1 wherein said track extends along a median strip between lanes of a divided highway.

5. The assembly defined in claim 1 wherein said track is elevated via a cantilever support over a portion of a highway.

6. The assembly defined in claim 1 wherein said traction wheel is disposed completely in said traction chamber.

7. The assembly defined in claim 1 wherein said shock absorbing means includes straps.

8. The assembly defined in claim 1 wherein said shock absorbing means includes shear mounts.

9. The assembly defined in claim 1 wherein said track is provided with heating means for de-icing said track during cold weather.

10. A transportation vehicle comprising:
    a frame;
    housing means on said frame for defining a traction chamber;
    at least one traction wheel rotatably mounted to said frame and at least partially disposed in said traction chamber;
    car means on said frame for defining a passenger compartment;
    shock absorbing means for connecting said car means to said frame so that said car means is substantially isolated from irregularities in a track or road surface during motion of the vehicle along said track or road surface, said traction chamber having an opening at least partially traversed by said wheel so that said wheel makes contact with said track or road surface;
    suction means operatively connected to said housing means for generating a vacuum in said traction chamber to press said housing and said wheel to said track or road surface;
    drive means mounted to said frame and operatively connected to said traction wheel for drivingly rotating said traction wheel to propel the vehicle along said track or road surface.

11. The assembly defined in claim 10, further comprising pressurization means mounted to said frame for generating an air cushion between said car means and said track or road surface during motion of said frame and said car means along said track or road surface at velocities under a predetermined speed.

12. The assembly defined in claim 11 wherein said car means is provided at a forward end with guide means for generating, via a ramjet process, a supporting cushion of air between said car means and said track or road surface at velocities above said predetermined speed.

13. A transportation method comprising the steps of:
    placing a cargo in a cargo compartment of a vehicle;
    closing said compartment;
    generating a vacuum in a traction chamber containing at least a portion of a traction wheel of said vehicle, thereby pressing said wheel against a track in communication with said chamber;
    rotating said wheel to drive said vehicle along said track; and
    mechanically buffering said compartment from irregularities in said track during motion of said vehicle along said track.

14. The method defined in claim 13 wherein said step of buffering includes the step of generating a layer of air between said compartment and said track.

15. The method defined in claim 14 wherein said layer of air is generated by fans at vehicle speeds below a predetermined speed.

16. The method defined in claim 15 wherein said layer of air is generated by a ramjet process at vehicle speeds above said predetermined speed.

17. The method defined in claim 14 wherein said layer of air is generated by a ramjet process at vehicle speeds above a predetermined speed.

* * * * *